United States Patent
Cronin

(10) Patent No.: US 9,742,894 B2
(45) Date of Patent: Aug. 22, 2017

(54) DISPOSABLE CONNECTABLE WIRELESS COMMUNICATION RECEIVER

(71) Applicant: ProSports Technologies, LLC, Miami, FL (US)

(72) Inventor: John E. Cronin, Bonita Springs, FL (US)

(73) Assignee: PROSPORTS TECHNOLOGIES, LLC, Miami, FL (US)

( * ) Notice: Subject to any disclaimer, the term of this patent is extended or adjusted under 35 U.S.C. 154(b) by 0 days.

(21) Appl. No.: 14/819,386

(22) Filed: Aug. 5, 2015

(65) Prior Publication Data

US 2016/0057610 A1   Feb. 25, 2016

Related U.S. Application Data

(60) Provisional application No. 62/041,219, filed on Aug. 25, 2014.

(51) Int. Cl.
| | |
|---|---|
| *H04L 27/00* | (2006.01) |
| *H04M 1/725* | (2006.01) |
| *H04W 12/06* | (2009.01) |
| *H04W 4/00* | (2009.01) |
| *H04W 12/08* | (2009.01) |

(52) U.S. Cl.
CPC ....... *H04M 1/72522* (2013.01); *H04W 12/06* (2013.01); *H04W 4/008* (2013.01); *H04W 12/08* (2013.01)

(58) Field of Classification Search
None
See application file for complete search history.

(56) References Cited

U.S. PATENT DOCUMENTS

| | | |
|---|---|---|
| 5,754,636 A | 5/1998 | Bayless et al. |
| 6,824,480 B2 | 11/2004 | John et al. |
| 7,583,901 B2 | 9/2009 | Nakagawa et al. |

(Continued)

FOREIGN PATENT DOCUMENTS

| | | |
|---|---|---|
| CN | 1741548 | 3/2006 |
| CN | 101815100 | 8/2010 |

(Continued)

OTHER PUBLICATIONS

U.S. Appl. No. 14/732,533, filed Jun. 5, 2015, John Cronin, Wireless Communication Driven by Object Tracking.

(Continued)

*Primary Examiner* — Wednel Cadeau
(74) *Attorney, Agent, or Firm* — Polsinelli LLP

(57) ABSTRACT

A wireless receiver can be connected to a user device, such as a smartphone or a tablet device. The wireless receiver can receive a wireless data communication from a wireless transmitter. The wireless data communication can include a message code that can be compared by the wireless receiver to a receiver code stored at the wireless receiver to determine whether the wireless transmitter was authorized to transmit the wireless data communication, and/or whether the wireless receiver is authorized to use the wireless data communication. The wireless receiver can then decode a message from the wireless data communication and transmit the message to the user device for viewing through an application.

20 Claims, 7 Drawing Sheets

(56) References Cited

U.S. PATENT DOCUMENTS

| | | | |
|---|---|---|---|
| 7,715,723 B2 | 5/2010 | Kagawa et al. |
| 7,899,159 B1 | 3/2011 | Croak et al. |
| 8,027,451 B2 | 9/2011 | Arendsen et al. |
| 8,175,913 B2 | 5/2012 | Checketts et al. |
| 8,188,878 B2 | 5/2012 | Pederson et al. |
| 8,540,583 B2 | 9/2013 | Leech |
| 8,565,607 B2 | 10/2013 | Kang et al. |
| 8,589,667 B2 | 11/2013 | Mujtaba et al. |
| 8,611,930 B2 | 12/2013 | Louboutin et al. |
| 8,620,344 B2 | 12/2013 | Huang et al. |
| 8,626,465 B2 | 1/2014 | Moore et al. |
| 8,630,216 B2 | 1/2014 | Deivasigamani et al. |
| 8,660,501 B2 | 2/2014 | Sanguinetti |
| 8,687,965 B2 | 4/2014 | Pederson et al. |
| 8,706,044 B2 | 4/2014 | Chang et al. |
| 8,724,723 B2 | 5/2014 | Panicker et al. |
| 8,750,207 B2 | 6/2014 | Jeong et al. |
| 8,793,094 B2 | 7/2014 | Tam et al. |
| 8,816,868 B2 | 8/2014 | Tan et al. |
| 8,831,529 B2 | 9/2014 | Toh et al. |
| 8,831,655 B2 | 9/2014 | Burchill et al. |
| 8,836,851 B2 | 9/2014 | Brunner |
| 8,843,158 B2 | 9/2014 | Nagaraj |
| 8,849,308 B2 | 9/2014 | Marti et al. |
| 8,862,060 B2 | 10/2014 | Mayor |
| 8,873,418 B2 | 10/2014 | Robinson et al. |
| 8,874,090 B2 | 10/2014 | Abuan et al. |
| 8,917,632 B2 | 12/2014 | Zhou et al. |
| 8,934,921 B2 | 1/2015 | Marti et al. |
| 9,635,506 B1 | 4/2017 | Cronin |
| 9,648,452 B1 | 5/2017 | Cronin |
| 2007/0022445 A1 | 1/2007 | Arseneau et al. |
| 2007/0140176 A1* | 6/2007 | Bachenberg ....... G06Q 30/0226 370/335 |
| 2009/0036205 A1 | 2/2009 | Seacal et al. |
| 2009/0310971 A1 | 12/2009 | Kim et al. |
| 2010/0082980 A1* | 4/2010 | Shiraki ..................... H04L 9/32 713/168 |
| 2010/0283630 A1 | 11/2010 | Alonso |
| 2010/0289644 A1 | 11/2010 | Slavin et al. |
| 2011/0055862 A1 | 3/2011 | Harp et al. |
| 2011/0294547 A1 | 12/2011 | Ni |
| 2011/0306326 A1 | 12/2011 | Reed et al. |
| 2012/0078667 A1 | 3/2012 | Denker et al. |
| 2012/0158995 A1* | 6/2012 | McNamee ............ H04L 45/306 709/238 |
| 2012/0314797 A1* | 12/2012 | Kummetz ............... H04L 27/34 375/295 |
| 2013/0126713 A1 | 5/2013 | Haas et al. |
| 2013/0141555 A1 | 6/2013 | Ganick et al. |
| 2013/0208184 A1 | 8/2013 | Castor et al. |
| 2013/0217332 A1* | 8/2013 | Altman .................. H04H 60/90 455/41.2 |
| 2013/0262163 A1 | 10/2013 | Bergdale et al. |
| 2013/0279917 A1 | 10/2013 | Son et al. |
| 2013/0303192 A1 | 11/2013 | Louboutin |
| 2013/0317835 A1 | 11/2013 | Mathew |
| 2013/0317916 A1 | 11/2013 | Gopalakrishnan et al. |
| 2013/0328917 A1 | 12/2013 | Zambetti et al. |
| 2013/0330088 A1 | 12/2013 | Oshima et al. |
| 2013/0331053 A1 | 12/2013 | Shoemaker |
| 2013/0331118 A1 | 12/2013 | Chhabra |
| 2013/0331137 A1 | 12/2013 | Burchill |
| 2013/0332108 A1 | 12/2013 | Patel |
| 2013/0332156 A1 | 12/2013 | Tackin |
| 2013/0336222 A1 | 12/2013 | Lu et al. |
| 2013/0336662 A1 | 12/2013 | Murayama et al. |
| 2013/0337787 A1 | 12/2013 | Yamada et al. |
| 2013/0343762 A1 | 12/2013 | Murayama et al. |
| 2014/0037296 A1 | 2/2014 | Yamada et al. |
| 2014/0062773 A1 | 3/2014 | MacGougan |
| 2014/0065962 A1 | 3/2014 | Le |
| 2014/0071221 A1 | 3/2014 | Dave |
| 2014/0098241 A1 | 4/2014 | Stout et al. |
| 2014/0105084 A1 | 4/2014 | Chhabra |
| 2014/0139380 A1 | 5/2014 | Ouyang |
| 2014/0141803 A1 | 5/2014 | Marti |
| 2014/0162628 A1 | 6/2014 | Bevelacqua |
| 2014/0167794 A1 | 6/2014 | Nath |
| 2014/0168170 A1 | 6/2014 | Lazarescu |
| 2014/0171114 A1 | 6/2014 | Marti |
| 2014/0173692 A1 | 6/2014 | Srinivasan |
| 2014/0180820 A1 | 6/2014 | Louboutin |
| 2014/0191979 A1 | 7/2014 | Tsudik |
| 2014/0200053 A1 | 7/2014 | Balasubramanian |
| 2014/0222335 A1 | 8/2014 | Piemonte |
| 2014/0232633 A1 | 8/2014 | Shultz |
| 2014/0232634 A1 | 8/2014 | Piemonte |
| 2014/0241730 A1 | 8/2014 | Jovicic |
| 2014/0247279 A1 | 9/2014 | Nicholas |
| 2014/0247280 A1 | 9/2014 | Nicholas |
| 2014/0256478 A1 | 9/2014 | Gale |
| 2014/0269562 A1 | 9/2014 | Burchill |
| 2014/0274150 A1 | 9/2014 | Marti |
| 2014/0283135 A1 | 9/2014 | Shepherd |
| 2014/0293959 A1 | 10/2014 | Singh |
| 2014/0357226 A1 | 12/2014 | Charugundla |
| 2014/0363168 A1 | 12/2014 | Walker |
| 2014/0364089 A1 | 12/2014 | Lienhart |
| 2014/0364148 A1 | 12/2014 | Block |
| 2014/0365120 A1 | 12/2014 | Vulcano |
| 2014/0375217 A1 | 12/2014 | Feri |
| 2015/0011242 A1 | 1/2015 | Nagaraj |
| 2015/0026623 A1 | 1/2015 | Horne |
| 2015/0031397 A1 | 1/2015 | Jouaux |

FOREIGN PATENT DOCUMENTS

| | | |
|---|---|---|
| CN | 102273323 | 12/2011 |
| CN | 102843186 | 12/2012 |
| CN | 202857947 | 4/2013 |
| CN | 103297888 | 9/2013 |
| CN | 103490812 | 1/2014 |
| EP | 2 549 442 | 1/2013 |
| KR | 10 2013-0116417 | 10/2013 |
| WO | WO 2009/104921 | 8/2009 |
| WO | WO 2013/070271 | 5/2013 |
| WO | WO 2013/109934 | 7/2013 |
| WO | WO 2014/085694 | 6/2014 |
| WO | WO 2016/032714 | 3/2016 |

OTHER PUBLICATIONS

U.S. Appl. No. 14/732,363, filed Jun. 5, 2015, John Cronin, Managing Third Party Interactions With Venue Communications.

U.S. Appl. No. 14/732,400, filed Jun. 5, 2015, John Cronin, Zone Based Wireless Player Communications.

U.S. Appl. No. 14/731,901, filed Jun. 5, 2015, John Cronin, Managing Smart Tickets.

PCT Application No. PCT/US2015/043882 International Search Report and Written Opinion dated Oct. 28, 2015.

About ByteLight, Date of Download: Jul. 18, 2014, www.bytelight.com/about.

"Create Innovative SERVICES with PLAY APPs", Date of Download: Jan. 16, 2014, http://www.oledcomm.com/LIFI.html, Oledcomm—France LiFi.

Danakis, C et al.; "Using a CMOS Camera Sensor for Visible Light Communication"; 3rd IEEE Workshop on Optical Wireless Communications; [online], Dec. 3-7, 2012 [retrieved Aug. 14, 2015]. Retrieved from the Internet: <URL: https://195.134.65.236/IEEE_Globecom_2012/papers/p1244-danakis.pdf> pp. 1244-1248.

Dawson, Keith; "LiFi in the Real World" All LED Lighting—Illuminating The Led Community, Jul. 31, 2013.

Gorman, Michael; "Outstanding Technology brings visible light communication to phones and tablets via dongle and LEDs", Edgadget International Editions, Jul. 16, 2012.

Haas, Harald; "Delivering safe and secure wireless communications", pureLiFi. Date of download: Jan. 16, 2014 http://purelifi.co.uk/.

(56) References Cited

OTHER PUBLICATIONS

Hao et al., Tian; "COBRA: Color Barcode Streaming for Smartphone Systems", MobiSys '12 Proceedings of the 10th International conference on Mobile systems, applications, and Services. pp. 85-98, Jun. 25, 2012.
Haruyama, Shinichiro; "Visible Light Communications: Recent Activities in Japan", Smart Spaces: A Smart Lighting ERC Industry -Academia Day at BU Photonics Center, Boston University. Feb. 8, 2011.
Komine, Toshihiko; Nakagawa, Masao; "Integrated System of White LED Visible-Light Communication Power-Line Communication", Dept. of Information and Computer Science, Keio University. Feb. 2003.
Kumar, Navin; "Visible Light Communications Systems Conception and VIDAS", IETE Technical Review, vol. 25, Issue 6, Nov.-Dec. 2008. Date of download: Nov. 19, 2009. http://www.tr.ietejournals.org.
LiFi Overview—Green wireless mobile communication—LiFi Technology. Date of download: Jan. 16, 2014.
Li, Yang et al., "VICO: A Framework for Configuring Indoor Visible Light Communication Networks" Aug. 11, 2012, Mobile Adhoc and Sensor Systems (MASS), 2012 IEEE 9th International Conference, Las Vegas, NV.
Little, Thomas; "Exploding Interest in Visible Light Communications: An Applications Viewpoint", Smart Light Annual Industry-Academia Days, Feb. 13-15, 2012.
Montero, Eric, "Design and Implementation of Color-Shift Keying for Visible Light Communications", Sep. 2013, McMaster University.
Nguyen et al., "A Novel like switching scheme using pre-scanning and RSS prediction in visible light communication networks", EURASIP Journal on Wireless Communications and Networking, 2013.
Ogawa; "Article about VLC Guidance developed", Visible Light Communications Consotium (VLCC), Aug. 31, 2012.
Ogawa; "iPhone app from CASIO", Visible Light Communications Consotium (VLCC), Apr. 26, 2012.
Pacchloll, David; "Optical wireless may be the answer to dropped calls, and more", PennState University, Oct. 2, 2013.
Povey, Gordon, "VLC for Location, positioning and navigation", Jul. 27, 2011, http://visiblelightcomm.com/vlc-for-location-positioning-and-n . . . .
Spaarmann, Stefan; "Opportunities for a Sustainable Communications Technology". 2009.
Thanigavel, M.; "Li-Fi Technology in Wireless Communication", International Journal of Engineering Research & Technology (IJERT), ISSN: 2278-0181, vol. 2 Issue 10, Oct. 2013.
"Visible Light Communication", HWCommunications . . . Creating the next generation of solutions. Date of Download: Aug. 10, 2014. http://cyber.hwcomms.com/cyber/VLC.
"Visible Light Communication for Mobile Phones.mp4", YOUTUBE, Apr. 26, 2012.
Won, Eun Tae; "Visible Light Communication: Tutorial", Project: IEEE P802.15 Working Group for Wireless Personal Area Networks (WPANs), Mar. 9, 2008.
Zhang et al., Weizhi; "Asynchronous indoor positioning system based on visible light communications", Optical Engineering 53(4), 045105 (Apr. 2014).
PCT Application No. PCT/US2015/033613 International Search Report and Written Opinion dated Sep. 1, 2015.
U.S. Appl. No. 14/731,901 Office Action dated Oct. 24, 2016.
U.S. Appl. No. 14/732,553, Final Office Action dated Nov. 16, 2016.
U.S. Appl. No. 14/732,400, Final Office Action dated Oct. 31, 2016.
U.S. Appl. No. 14/732,553, Office Action dated May 9, 2016.
U.S. Appl. No. 14/732,400, Office Action dated May 10, 2016.
U.S. Appl. No. 14/731,901 Final Office Action dated May 30, 2017.

\* cited by examiner

Wireless Settings GUI 405

Communication Source 410

- ● Allow wireless receiver data
- ○ Allow Ads
- ● Allow Emergency data
- ● Allow sports data
  - •ESPN
- ○ Add input source

Communication Type 415

- ● All
- ○ Video
- ○ Audio
- ○ Text
- ○ Vibrate
- ○ Add input type

FIG. 4A

DISPOSABLE CONNECTABLE WIRELESS COMMUNICATION RECEIVER

CROSS-REFERENCE TO RELATED APPLICATIONS

The present application claims the priority benefit of U.S. provisional application No. 62/041,219 filed Aug. 25, 2014 entitled "VLC Disposable VLC Detector," the disclosure of which is hereby incorporated by reference.

BACKGROUND

Field of Invention

The present invention generally relates to wireless digital communication. More specifically, the present invention relates to disposable wireless receivers that can be connected to user devices to allow the user devices to receive wireless digital communications.

Description of the Related Art

Traditionally, the field of digital communications includes wired and wireless transfer of information. Digital communications may include direct communications in which information is transmitted from a sender device to a recipient device, and may also include "indirect" communications in which information is transmitted from a sender device, through one or more "intermediary" or "middleman" devices, and eventually to a recipient device.

One example of wired transfer includes data transmitted from a sender device to a recipient device using a Universal Serial Bus (USB) cable. Another example of a wired transfer includes data transmitted within a private Local Area Network (LAN) from a sender device to a router through a sender Ethernet cable, and from the router to a recipient device through a recipient Ethernet cable.

One example of wireless transfer includes data transmitted from a sender device to a recipient device using a Bluetooth protocol connection. Another example of a wired transfer includes data transmitted within a private Wireless Local Area Network (WLAN) from a sender device to a router through a wireless Wi-Fi connection, and from the router to a recipient device through a wireless Wi-Fi connection. Other examples of wireless transfer include Bluetooth communications, Visible Light Communications (VLC), radio wave communications, microwave communications, or sonic communications.

Different types of wireless communications may require different types of hardware receivers to receive. For example, Bluetooth communications require a Bluetooth receiver to receive, VLC communications require a photodetector to receive, radio wave communications require a radio wave receiver (e.g., antenna) to receive, microwave communications require a microwave receiver to receive, and sonic communications require a microphone to receive. Similarly, different types of wireless communications may require different types of hardware (e.g., a digital-to-analog converter or an analog-to-digital converter) or software to decode once received.

User devices, such as smartphone devices and tablet devices, are often built to be as small as possible. As a result, certain functionalities that might be included within larger machines are often left out of such user devices. For example, some user devices may lack the capability to receive particular types of wireless communications due to a lack of required hardware and/or software.

Thus, an alternate means for receiving wireless digital communications is needed.

SUMMARY OF THE CLAIMED INVENTION

One exemplary method for wireless digital communication includes receiving a wireless transmission at a receiver device, the receiver device connected to a user device, the wireless transmission sent from a wireless transmitter. The method also includes decoding a message code included within the wireless transmission. The method also includes retrieving a receiver code from a memory of the receiver device. The method also includes determining an authorization status of the receiver device in relation to the wireless transmission based on a comparison between the message code and the receiver code. The method also includes decoding a message included within the wireless transmission. The method also includes transmitting at least the message to the user device based on the determined authorization status.

One exemplary system for wireless digital communication includes a receiver device that is connected to a user device. Execution of instructions stored in a first memory of the receiver device by a processor of the receiver device performs various system operations. The system operations include receiving a wireless transmission that was sent from a wireless transmitter. The system operations also include decoding a message code included within the wireless transmission. The system operations also include retrieving a receiver code from a second memory of the receiver device. The system operations also include determining an authorization status of the receiver device in relation to the wireless transmission based on a comparison between the message code and the receiver code. The system operations also include decoding a message included within the wireless transmission. The system operations also include transmitting at least the message to the user device based on the determined authorization status.

One exemplary non-transitory computer-readable storage medium is also described, the non-transitory computer-readable storage medium having embodied thereon a program executable by a processor to perform an exemplary program method for wireless digital communication that includes receiving a wireless transmission at a receiver device, the receiver device connected to a user device, the wireless transmission sent from a wireless transmitter. The program method also includes decoding a message code included within the wireless transmission. The program method also includes retrieving a receiver code from a memory of the receiver device. The program method also includes determining an authorization status of the receiver device in relation to the wireless transmission based on a comparison between the message code and the receiver code. The program method also includes decoding a message included within the wireless transmission. The program method also includes transmitting at least the message to the user device based on the determined authorization status.

BRIEF DESCRIPTION OF THE DRAWINGS

FIG. 4A illustrates an exemplary wireless setting graphical user interface of a user device.

DETAILED DESCRIPTION

A wireless receiver can be connected to a user device, such as a smartphone or a tablet device. The wireless receiver can receive a wireless data communication from a wireless transmitter. The wireless data communication can include a message code that can be compared by the wireless receiver to a receiver code stored at the wireless receiver to determine whether the wireless transmitter was authorized to transmit the wireless data communication, and/or whether the wireless receiver is authorized to use the wireless data communication. The wireless receiver can then decode a message from the wireless data communication and transmit the message to the user device for viewing through an application.

Figure 1:
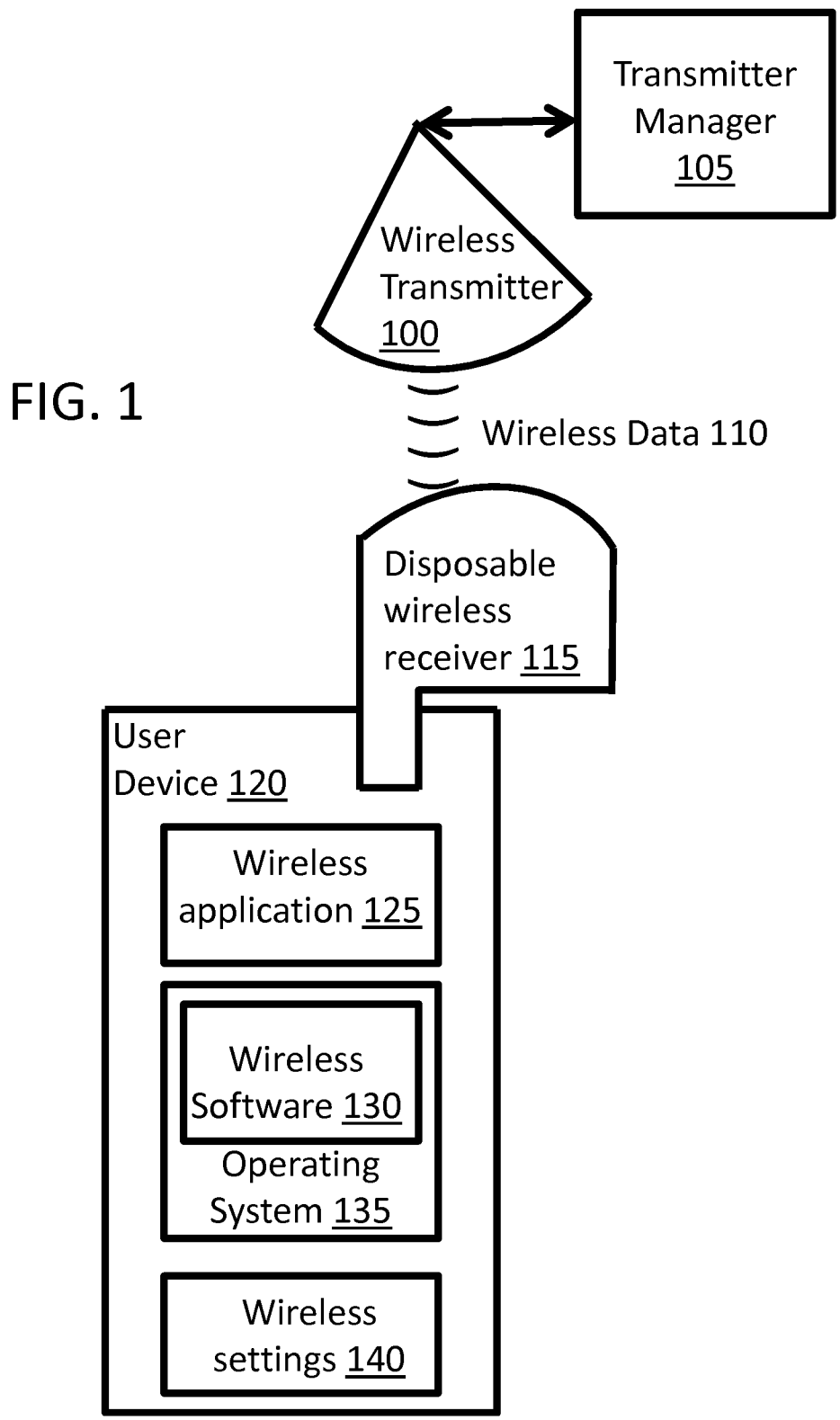
FIG. 1 illustrates an exemplary wireless data communication between a wireless transmitter and a user device connected to a disposable wireless receiver.

FIG. 1 illustrates an exemplary wireless data communication between a wireless transmitter and a user device connected to a disposable wireless receiver.

The wireless data communication shown in FIG. 1 includes wireless data 110 that is being transmitter from a wireless transmitter 100 and received by a disposable wireless receiver 115.

The wireless transmitter 100 may include any type of wireless transmission or communication module. For example, the wireless transmitter 100 may transmit information using a Wi-Fi connection module, a 3G/4G/LTE cellular connection module, a Bluetooth connection module, a Bluetooth low energy connection module, Bluetooth Smart connection module, a near field communication module, a radio wave communications module, a microwave communications module, a magnetic induction transmitter, a magnetic resonance transmitter, an electromagnetic radiation transmission module, a visible light communication (VLC) transmission lamp/laser/module, a laser transmission module, a speaker (e.g., audible sound transmitter, ultrasonic transmitter, infrasonic transmitter) with or without noise cancelling features, or some combination thereof. The wireless transmitter 100 may include any number of sub-transmitters. The wireless transmitter 100 may be configured to be able to encode and/or transmit at least the wireless data 110 to be received by the disposable wireless receiver 115.

The disposable wireless receiver 115 may include any type of wireless receiver or communication module. For example, the disposable wireless receiver 115 may include a Wi-Fi connection module, a 3G/4G/LTE cellular connection module, a Bluetooth connection module, a Bluetooth low energy connection module, Bluetooth Smart connection module, a near field communication module, a radio wave communications module, a microwave communications module, a magnetic induction receiver, a magnetic resonance receiver, an electromagnetic radiation receiver module, a visible light communication (VLC) receiver module, a laser transmission receiver module, a microphone (e.g., audible sound receiver, ultrasonic receiver, infrasonic receiver) with or without noise cancelling features, or some combination thereof. The disposable wireless receiver 115 may include any number of sub-receivers. The disposable wireless receiver 115 may be configured to be able to receive and/or decode at least the wireless data 110 sent by the wireless transmitter 100.

The disposable wireless receiver 115 is connected to a user device 120. The connection between the disposable wireless receiver 115 and the user device 120 may be a physical or wired connection. For example, the disposable wireless receiver 115 may be connected to the user device 120 via a Universal Serial Bus (USB) cable, a lightning cable, a thunderbolt cable, an audio jack cable, a 30-pin cable, an HDMI cable, or another type of cable. Alternately, the disposable wireless receiver 115 may be connected to the user device 120 through a wireless connection, which may be short-range or long-range. For example, the disposable wireless receiver 115 may be connected to the user device 120 via a Bluetooth connection, through a magnetic induction connection, through a magnetic resonance connection, through a radio frequency identification (RFID) connection, or through a near-field-communication (NFC) connection.

The user device 120 may be a computer device 600, or may be a device with a subset of the components of the computer device 600. In particular, the user device 120 may include any type of processor (e.g., processor 610), any type of display (e.g., display 670), and/or any type of memory (e.g., memory 620, mass storage 630, portable storage 640, or any combination thereof). The memory of the fan device 110 may store, and the processor may execute, various instructions for executing software and associated user interfaces, such as various graphical user interfaces (GUIs). The user device 120 may be, for example, a smartphone, a tablet device, a laptop, a portable media player device, a portable video game console, or a portable e-book reader device.

The user device 120 may execute a variety of software elements at the processor of the user device 120, some of which may receive inputs through an input interface of the user device 120 (e.g., a touchscreen, a keyboard/keypad, a mouse, a joystick, a button, a microphone, a switch, a connector, or some combination thereof) and/or output visual data via a display and/or audio data via a speaker.

Figure 4B:
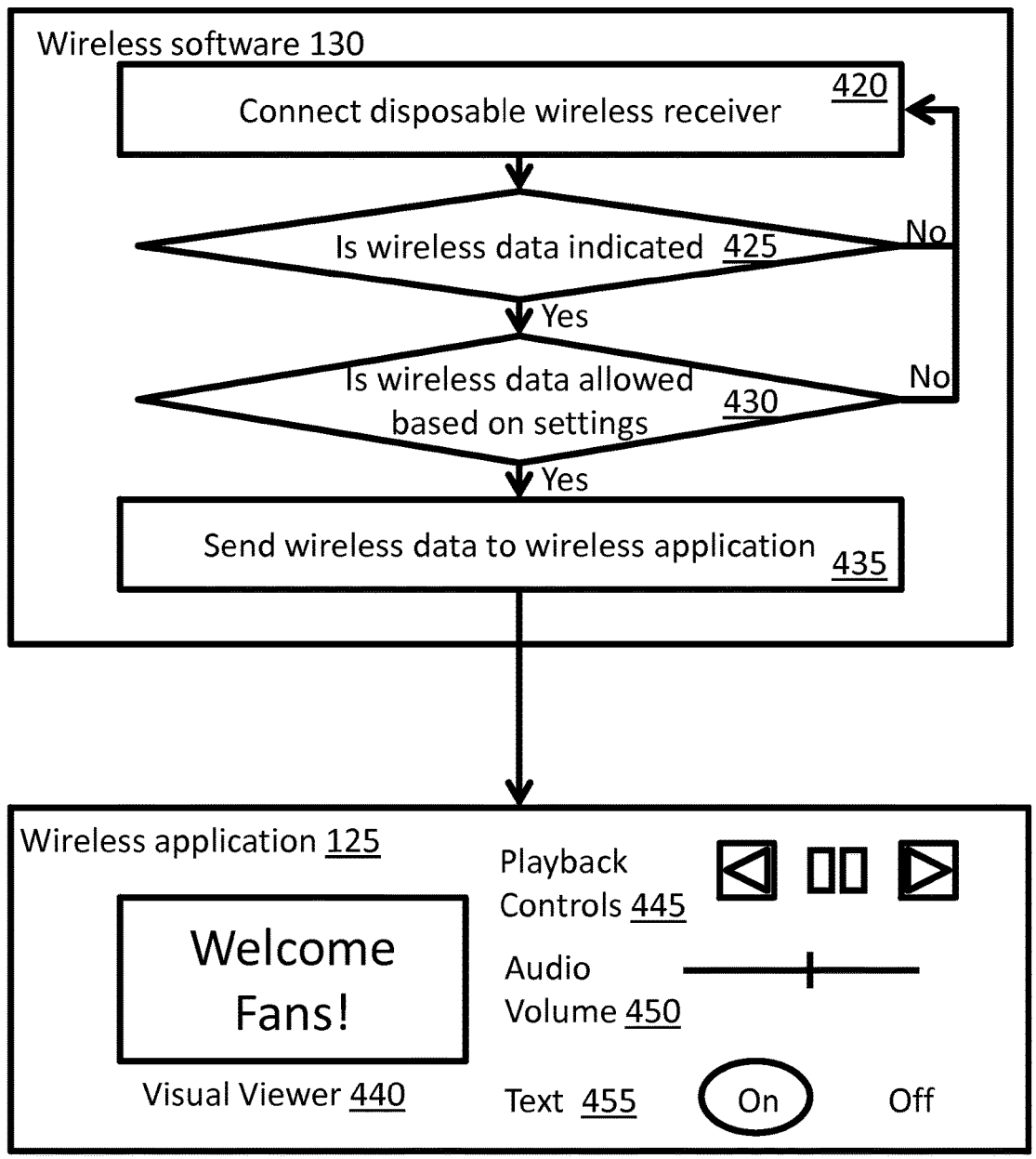
FIG. 4B is a flow diagram illustrating exemplary operations of a wireless software and an exemplary user interface of a wireless application.

The user device 120 may in particular execute a wireless application 125 (e.g., see FIG. 4B), a wireless software 130 (e.g., see FIG. 4B), an operating system 135, and a set of wireless settings 140 which may be provided by wireless settings graphical user interface (GUI) 405 (e.g., see FIG. 4A).

The wireless transmitter 100 may in some cases be controller, managed, or monitored by an optional transmitter manager system 105. The transmitter manager system 105 may include one or more computer systems 600, which may include multiple computer systems 600 networked together (e.g., in a "LAN" local area network or a "WLAN" wireless local area network), multiple computer systems 600 distributed throughout the Internet, or some combination thereof. The transmitter manager system 105 may be connected to one or more secondary wired transmitters and/or wireless transmitters in addition to the wireless transmitter 100.

The wireless transmitter 100 may in some cases be associated with an event taking place at an event venue. For example, the wireless data 110 transmitted by the wireless transmitter 100 may include sports data for eventgoers of a sports event, or may include music data for eventgoers of a music concert. The wireless transmitter 100 may in such cases be associated with a variety of types of events, public or private, such as entertainment or cultural events that are presented at a theater, gymnasium, church, stadium, or other facility to a group of people. Such events include a wide variety of sporting events such as football (American and Global), baseball, basketball, soccer, ice hockey, lacrosse, rugby, cricket, tennis, track and field, golf, cycling, motor sports such as automobile or motorcycle racing, horse racing, Olympic games, and the like; cultural events such as concerts, music festivals, plays, or the opera, and the like; religious events; and more permanent exhibitions such as a museum, historic home, and the like. In such cases, the transmitter manager system 105 may be associated with the event or the event venue.

In an alternate embodiment (not shown), the wireless transmitter 110 may include a wired transmission mechanism, such as an Ethernet cable or a fiber optic cable or a modem cable. The disposable wireless receiver 115 may be connected to the wireless transmitter 110 through the wired transmission mechanism (e.g., via an Ethernet port, fiber optic port, or modem port of the disposable wireless receiver 115). This may serve as an alternate communication mechanism or as a primary communication mechanism. In this way, a portable user device 120 could be permitted to connect to a wired connection.

Figure 2:
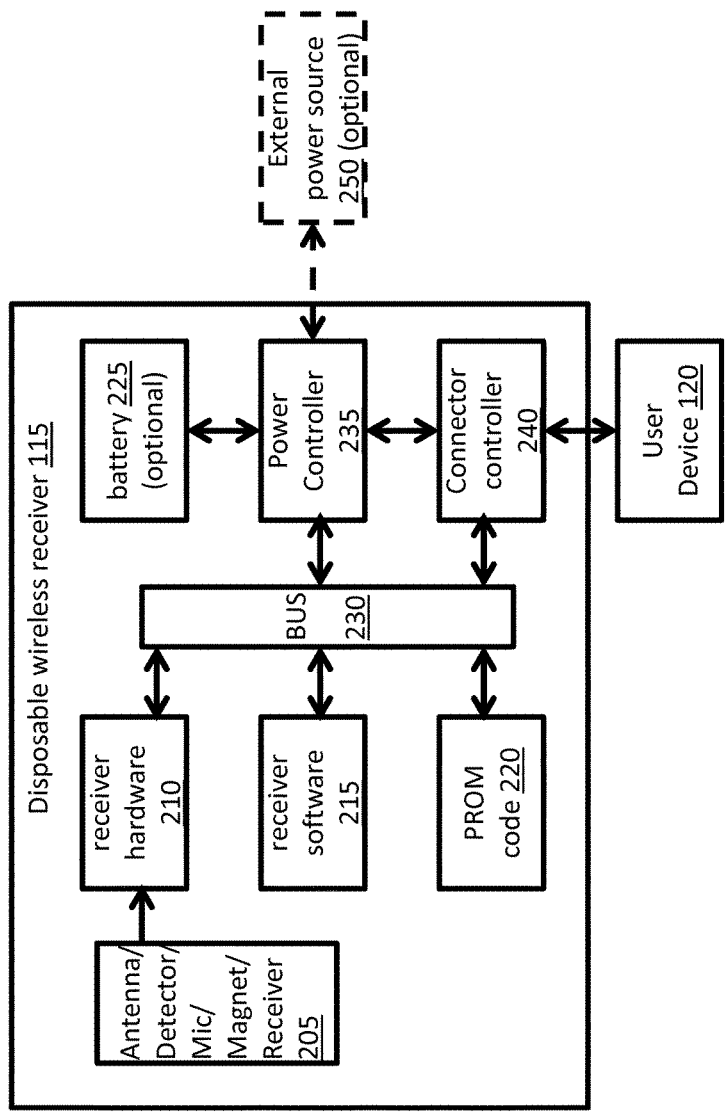
FIG. 2 illustrates an exemplary disposable wireless receiver.

FIG. 2 illustrates an exemplary disposable wireless receiver. The disposable wireless receiver 115 of FIG. 2 may include a central bus 230, to which its other components may be directly or indirectly connected. In an alternate embodiment (not shown), the disposable wireless receiver 115 may be less centralized and may include one or more secondary busses, which may or may not then be connected to each other.

The disposable wireless receiver 115 of FIG. 2 includes receiver hardware 210, which may include hardware controller hardware (e.g., including data routing, frequency modulation, analog-to-digital converters, digital-to-analog converters, filters, or some combination thereof) as well as one or more particular receiver components 205 that are specific to receiving a particular type of communication, such as antennas (e.g., for receiving radio wave or microwave or cellular or Bluetooth or Wi-Fi communications), photodetectors (e.g., for receiving VLC communications or infrared or ultraviolet communications), microphones (e.g., for receiving audible, ultrasonic, or infrasonic audio-based communications), electromagnets or magnetic coils (e.g., for receiving magnetic resonance or magnetic induction communications), or other components that can be used to receive wireless communications. The receiver components 205 may also include ports for receiving wires communications (e.g., Ethernet ports, fiber optic ports, modem ports).

The disposable wireless receiver 115 of FIG. 2 includes receiver software 215. The receiver software 215 may be used to decode communications and extract messages (e.g., which may include text, images, audio, video, documents, data structures, other software files, other data files, or some combination thereof). Exemplary operations of the receiver software 215 are further illustrated in FIG. 3.

The disposable wireless receiver 115 of FIG. 2 includes a programmable read-only memory (PROM) code 220. The PROM code 220 may be a code programmed into a programmable read-only memory (PROM) of the disposable wireless receiver 115. The receiver software 215 may check the PROM code 220 against a transmission code embedded in the wireless data 110 sent by the wireless transmitter 100 and received by the disposable wireless receiver 115. The PROM code 220 may also be stored at the wireless transmitter 100 as part of a "message code" that is inserted into the wireless data 110 before it is sent by the wireless transmitter 100.

The PROM code 220 can be used by the disposable wireless receiver 115 for one of two security functions. Firstly, the PROM code 220 can be used by the disposable wireless receiver 115 to ensure that the disposable wireless receiver 115 is has permission to read a message included within the wireless data transmission 110. For example, the "message code" stored by the wireless transmitter 100 and sent along with the wireless data transmission 110 may include a list of authorized PROM codes that the disposable wireless receiver 115 may then compare to its PROM code and either decode the message or refrain from doing so. Secondly, the PROM code 220 can be used by the disposable wireless receiver 115 to ensure that the wireless data transmission 110 came from the wireless transmitter 100, since at least part of the "message code" sent along with the wireless data transmission 110 may identify the wireless transmitter 100 and be compared against a list of authorized wireless transmitters that the disposable wireless receiver 115 may receive from.

In alternate embodiments, the disposable wireless receiver 115 may identify whether it is authorized to read a wireless data transmission 110 or whether the wireless data transmission 110 came from the correct wireless transmitter 100 based on a different security method, such as via transfer of symmetric encryptions keys, transfer of asymmetric encryption keys (e.g., as part of a public key infrastructure), or transfer of certificates signed by a certificate authority.

The disposable wireless receiver 115 of FIG. 2 includes a connector controller 240, which allows the disposable wireless receiver 115 to be connected to a user device 120. The disposable wireless receiver 115 may be connected to the user device 120 via a Universal Serial Bus (USB) cable, a lightning cable, a thunderbolt cable, an audio jack cable, a 30-pin cable, an HDMI cable, or another type of cable, which may be controlled and/or monitored by the connector controller 240. Alternately, the disposable wireless receiver 115 may be connected to the user device 120 through a wireless connection, which may be short-range or long-range, such as a Bluetooth connection, a magnetic induction connection, a magnetic resonance connection, a radio frequency identification (RFID) connection, or a near-field-communication (NFC) connection, which may be controlled and/or monitored by the connector controller 240.

The disposable wireless receiver 115 of FIG. 2 includes a power controller 235, which may control power input and output for the disposable wireless receiver 115. The power controller 235 may optionally control and/or monitor power input from a battery 225 of the disposable wireless receiver 115, which may be a replaceable battery (e.g., a set of AA or AAA batteries) or a rechargeable battery (e.g., a lead-acid battery, a lithium-ion battery, a nickel-cadmium battery, a nickel-metal hydride battery, a lithium polymer battery, a lithium-sulfur battery, or a sodium-ion battery). The power controller 235 may also optionally control and/or monitor power input from an external power source 250, which may be power from an alternating current power grid socket, a direct current power socket, a generator (e.g., mechanical, chemical, petrochemical, nuclear, solar, wind, hydroelectric), or an external battery of one of the types described in relation to the battery 225.

Figure 3:
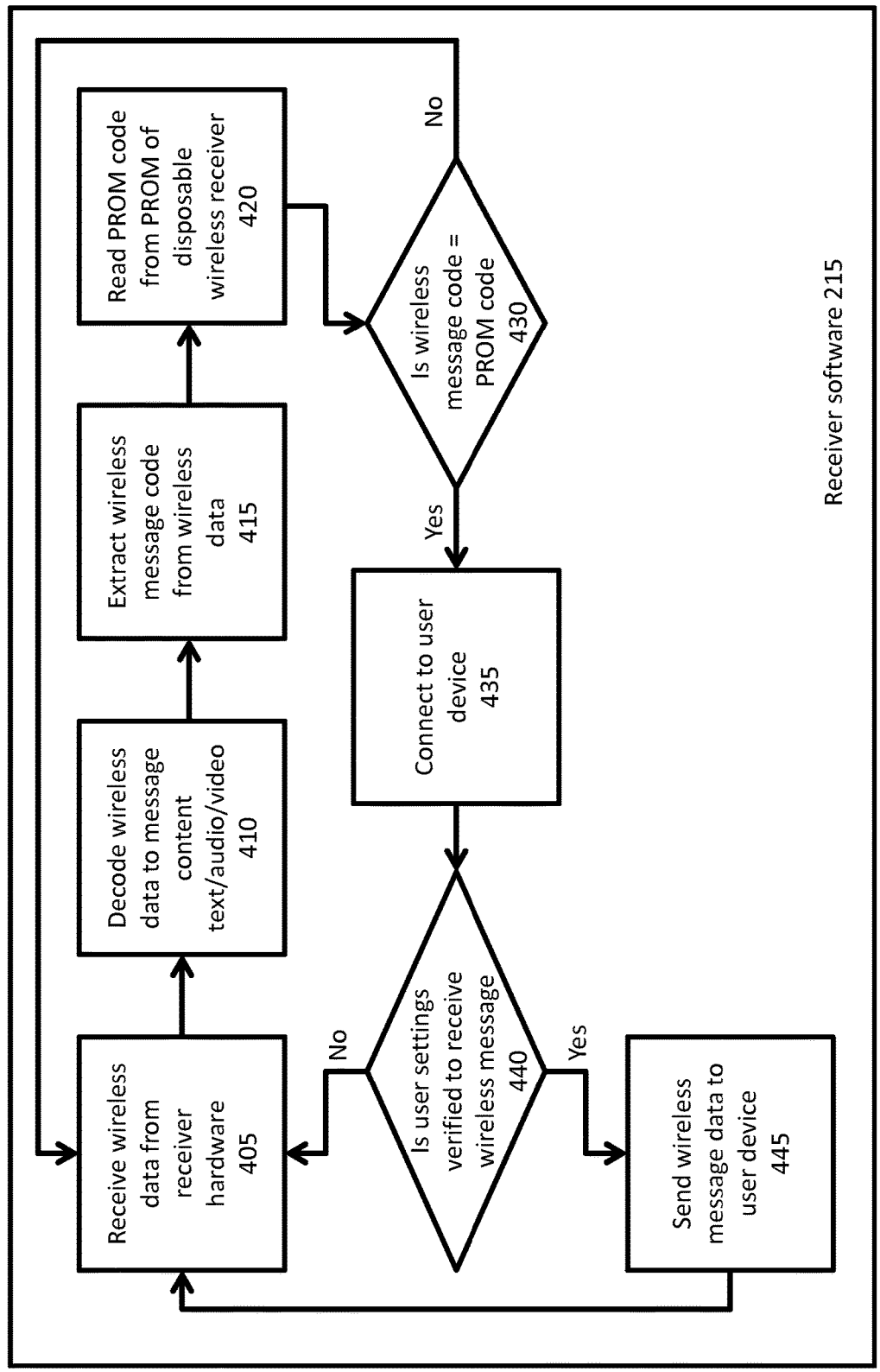
FIG. 3 is a flow diagram illustrating exemplary operations of a receiver software.

FIG. 3 is a flow diagram illustrating exemplary operations of a receiver software. The receiver software 215 may begin at step 405 by receiving wireless data 110 from the receiver hardware 210, which has received the wireless data 110 from the wireless transmitter 100.

At step 410, the receiver software 215 then decodes message content of a wireless data transmission 110. Such message content may include text, images, audio, video, documents, data structures, other software files, other data files, or some combination thereof.

At step 415, the receiver software 215 then extracts a "message code" from the wireless data transmission 110. The message code may include a transmitter code associated with the wireless transmitter 100, a receiver code associated with the disposable wireless receiver 115, or some combination thereof.

At step 420, the receiver software 215 then reads a PROM code 220 from a PROM memory of the disposable wireless receiver 115. The PROM code 220 may include a transmitter code associated with the wireless transmitter 100, a receiver code associated with the disposable wireless receiver 115, or some combination thereof.

At step 430, the receiver software 215 then compares the "message code" of step 410 and the PROM code 220 of step 415.

Step 430 may include checking to see if a transmitter code (that is associated with the wireless transmitter 100) included within the "message code" is also included within the PROM code 220, which would mean that the wireless transmitter 100 is an authorized wireless transmitter from which the disposable wireless receiver 115 is allowed to receive wireless data 110. This could prevent the disposable wireless receiver 115 from picking up noise from other communications, could prevent a malicious third party from sending dangerous data (e.g., malware or a virus) to the disposable wireless receiver 115.

Step 430 may also (or alternately) include checking to see if a receiver code (that is associated with the disposable wireless receiver 115) is included within the "message code" is also included within the PROM code 220, which would mean that the disposable wireless receiver 115 is an authorized recipient of the wireless data 110 sent from the wireless transmitter 100. This could allow control over which disposable wireless receivers 115 of a group of disposable wireless receiver 115 actually work, which could allow an entity to, of example, sell access to communications by selling access to working disposable wireless receiver 115 (and ensuring other disposable wireless receivers 115 won't read those wireless transmissions 110).

If there is a mismatch between the message code and PROM code in step 430, the receiver software 215 can return to step 405.

If there is a match between the message code and PROM code in step 430 receiver software 215 can move on to step 435, in which the receiver software 215 aids in connecting the disposable wireless receiver 115 to the user device 120 (e.g., via the connector controller 240 and any connector or cable or wireless connection described in connection with the connector controller 240 in regard to FIG. 2).

In step 440, the receiver software 215 then checks a set of v settings 140, which may be based on the wireless settings GUI 405, and which may identify different types of allowed or disallowed content sources (e.g., sports content, advertisement content) or content types (e.g., text, images, audio, video, documents, data structures, other software files, other data files). If there is a mismatch between the message content type of the decoded message from the wireless data 110 and the allowed content types or allowed content sources in the wireless settings 140 from the wireless settings GUI 405, the receiver software 215 can return to step 405.

If there is a match between the message content type of the decoded message from the wireless data 110 and the allowed content types and allowed content sources in the wireless settings 140 from the wireless settings GUI 405, the receiver software 215 can then, at step 445, send the message content that was decoded at step 410 from the wireless data 110 to the user device 120, or send the entire wireless data 110 to the user device 120, or both. The user decide 120 may then in some cases then run the message content through a wireless software 130 to be displayed at a wireless application 125 as illustrated in FIG. 4B. The receiver software 215 can return to step 405.

FIG. 4A illustrates an exemplary wireless setting graphical user interface of a user device. The wireless setting GUI 405 of the user device 120 may include a variety of GUI elements, such as checkboxes, buttons, sliders, switches, or radio buttons, and can be used to allow a user to adjust a set of wireless settings 140 stored at the user device 120.

In particular, the wireless settings GUI 405 of FIG. 4A allows editing of wireless settings 140 related to communication sources 410 and of wireless settings 140 related to communication types 415. For example, wireless settings 140 related to communication sources 410 may include allowing data from the disposable wireless receiver 115, allowing advertisement data, allowing emergency data, allowing sports data (e.g., Entertainment and Sports Programming Network or "ESPN"), or the ability to add an input source. Wireless settings 140 related to communication types 415 may include allowing all data, allowing video data, allowing audio data, allowing text data, allowing vibrational data (e.g., vibrations to notify a user of the user device 120 that a certain event has occurred, such as a score or a touchdown), or the addition of an input type.

FIG. 4B is a flow diagram illustrating exemplary operations of a wireless software and an exemplary user interface of a wireless application.

The wireless software 130 operations begin, at step 420, with connecting the disposable wireless receiver 115 to the user device 120 in a wired or wireless manner as described above in relation to FIG. 1 or step 435 of FIG. 3.

The wireless software 130 then, at step 425, checks to see whether receipt of wireless data 110 is indicated. If not, the wireless software 130 can return to step 420. If receipt of wireless data 110 is indicated, the wireless software 130 can move on the step 430.

The wireless software 130 then, at step 430, checks to see whether the receipt of the wireless data 110 is allowed based on the wireless settings 140 associated with the user device 120. If not, the wireless software 130 can return to step 420. If the wireless data 110 is allowed based on the wireless settings 140 associated with the user device 120, the wireless software 130 can move on the step 435.

The wireless software 130 then, at step 425, sends the wireless data 110 to the wireless application 125.

An exemplary GUI for the wireless application 125 is then illustrated in FIG. 4B as well.

The exemplary wireless application 125 includes a visual viewer 440, which can display images and/or video and/or text from the message content of the wireless data 110. The images and/or video and/or text displayed at the visual viewer 440 can be streamed live to the user device 120 or can be pre-recorded and pre-loaded onto the user device 120.

The wireless application 125 can also include playback controls 445, which may allow some control over the playback of videos and/or audio through the visual viewer 440 and/or through an audio output (e.g., speakers or a headphone/auxiliary jack/port/cable), or the playback of images and/or text (e.g., if displayed in a "slideshow" style). The playback controls 445 can include, for example, a play control, a pause control, a rewind control, a fast-forward control, a skip previous control, a skip next control, or some combination thereof. Certain controls might not always be available—for example, a live-streamed video might not have an available a fast-forward control (e.g., unless it had previously been rewound and was currently playing recorded video data) or a skip forward control.

The wireless application 125 can also include an audio volume control, which can adjust the output volume of an audio output (e.g., speakers or a headphone/auxiliary jack/port/cable) of video data from the wireless data 110 and/or of audio data from the wireless data 110.

The wireless application 125 also includes a text setting 455 to turn text on or off. This may adjust the wireless settings 140, or may alternately turn off a particular situation in which text data from the wireless data 110 may be used, such as in the context of closed captions for audio data and/or video data from the wireless data 110.

Figure 5:
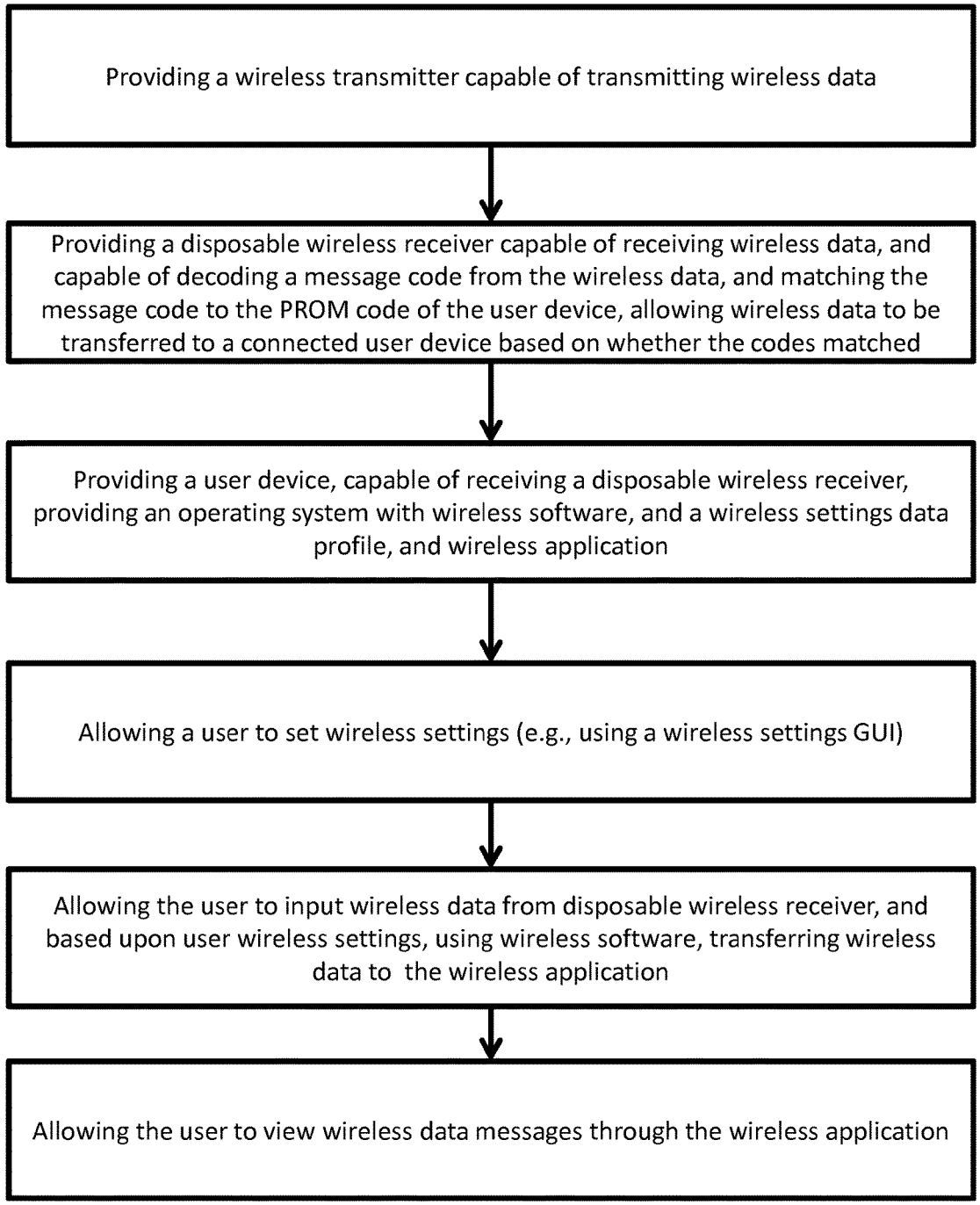
FIG. 5 illustrates an exemplary overall method of the present invention as described herein.

FIG. 5 illustrates an exemplary overall method of the present invention as described herein.

At step 510, the method includes providing a wireless transmitter 100 capable of transmitting wireless data 110.

At step 520, the method includes providing a disposable wireless receiver 115 capable of receiving wireless data 110, and capable of decoding a message code from the wireless data, and matching the message code to the PROM code 220 of the user device 120, allowing wireless data 110 to be transferred to a connected user device 120 based on whether the codes matched.

At step 530, the method includes providing a user device, capable of receiving a disposable wireless receiver, providing an operating system with wireless software, and a wireless settings data profile, and wireless application.

At step 540, the method includes allowing a user to set wireless settings 140 (e.g., using a wireless settings GUI 405).

At step 550, the method includes allowing the user to input wireless data 100 from the disposable wireless receiver 115, and based upon wireless settings 140, using wireless software 130, transferring wireless data 110 to the wireless application 125.

At step 560, the method includes allowing the user to view wireless data 110 messages through the wireless application 125.

Figure 6:
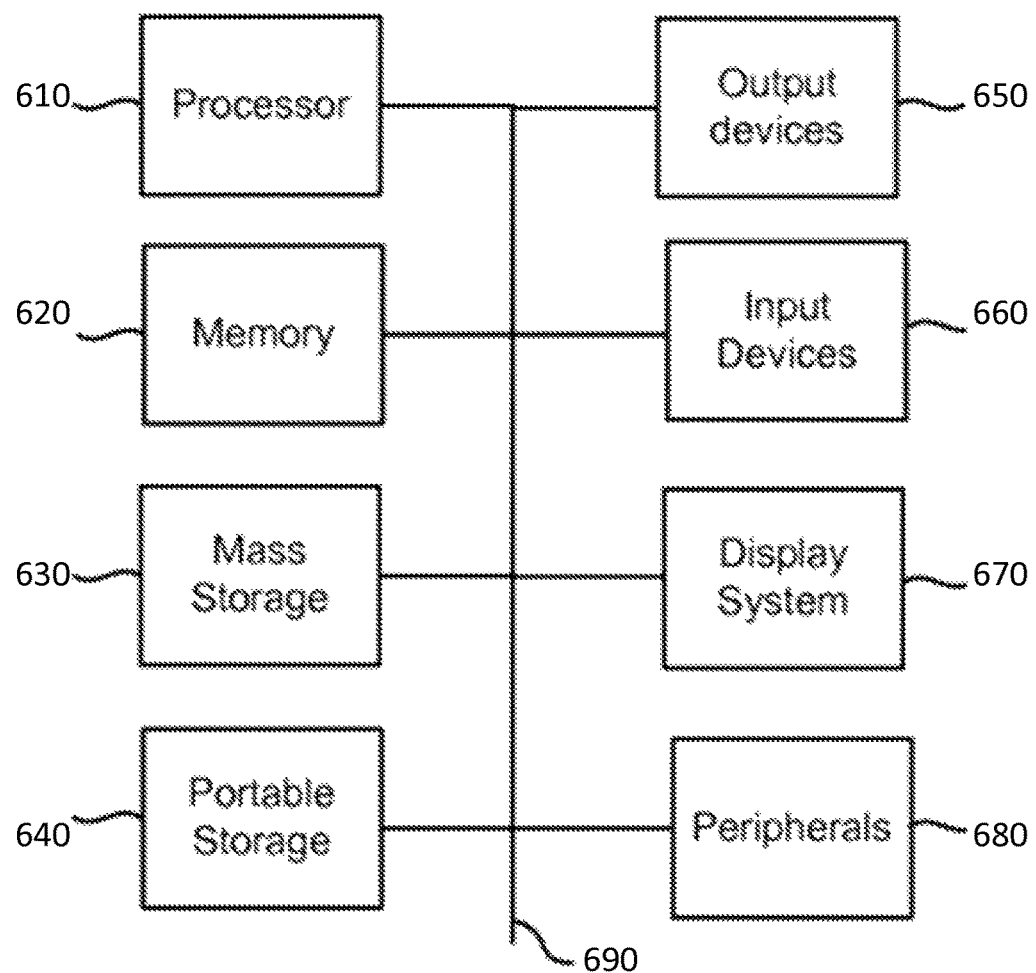
FIG. 6 is a block diagram of an exemplary computing device that may be used to implement an embodiment of the present invention.

FIG. 6 illustrates an exemplary computing system 600 that may be used to implement an embodiment of the present invention. The computing system 600 of FIG. 6 includes one or more processors 610 and memory 610. Main memory 610 stores, in part, instructions and data for execution by processor 610. Main memory 610 can store the executable code when in operation. The system 600 of FIG. 6 further includes a mass storage device 630, portable storage medium drive(s) 640, output devices 650, user input devices 660, a graphics display 670, and peripheral devices 680.

The components shown in FIG. 6 are depicted as being connected via a single bus 690. However, the components may be connected through one or more data transport means. For example, processor unit 610 and main memory 610 may be connected via a local microprocessor bus, and the mass storage device 630, peripheral device(s) 680, portable storage device 640, and display system 670 may be connected via one or more input/output (I/O) buses.

Mass storage device 630, which may be implemented with a magnetic disk drive or an optical disk drive, is a non-volatile storage device for storing data and instructions for use by processor unit 610. Mass storage device 630 can store the system software for implementing embodiments of the present invention for purposes of loading that software into main memory 610.

Portable storage device 640 operates in conjunction with a portable non-volatile storage medium, such as a floppy disk, compact disk or Digital video disc, to input and output data and code to and from the computer system 600 of FIG. 6. The system software for implementing embodiments of the present invention may be stored on such a portable medium and input to the computer system 600 via the portable storage device 640.

Input devices 660 provide a portion of a user interface. Input devices 660 may include an alpha-numeric keypad, such as a keyboard, for inputting alpha-numeric and other information, or a pointing device, such as a mouse, a trackball, stylus, or cursor direction keys. Additionally, the system 600 as shown in FIG. 6 includes output devices 650. Examples of suitable output devices include speakers, printers, network interfaces, and monitors.

Display system 670 may include a liquid crystal display (LCD), a plasma display, an organic light-emitting diode (OLED) display, an electronic ink display, or another suitable display device. Display system 670 receives textual and graphical information, and processes the information for output to the display device. The display system 670 may include touchscreen input capabilities, such as capacitive touch detection.

Peripherals 680 may include any type of computer support device to add additional functionality to the computer system. For example, peripheral device(s) 680 may include a modem or a router.

The components contained in the computer system 600 of FIG. 6 are those typically found in computer systems that may be suitable for use with embodiments of the present invention and are intended to represent a broad category of such computer components that are well known in the art. Thus, the computer system 600 of FIG. 6 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, Android, iOS, and other suitable operating systems.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.).

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for wireless digital communication, the method comprising:
receiving a wireless transmission at a receiver device via a light sensor of the receiver device, the receiver device communicatively coupled to a user device via a wireless Bluetooth connection, the wireless transmission sent from a wireless transmitter via a light-based wireless transmission protocol thereby making the wireless transmission interpretable by the receiver device but not by the user device;

decoding a message code at the receiver device, the message code included within the wireless transmission;

retrieving a receiver code from a memory of the receiver device;

identifying that the message code matches the receiver code;

identifying that the receiver device is authorized to read a message encoded within at least a subset of the wireless transmission based on the identified match between the message code and the receiver code;

decoding a message included within the wireless transmission based on the identification that the receiver device is authorized to read the message;

identifying that the message includes executable software as a first content type and at least one second content type selected from a text content type, an image content type, an audio content type, a video content type, a document content type, a data structure content type, and a data file content type;

receiving a setting from the user device, the setting identifying that the first content type is disallowed in the message;

modifying the message by removing the first content type from the message without removing the second content type from the message; and transmitting at least the modified message from the receiver device to the user device via the wireless Bluetooth connection, thereby outputting at least a subset of the message at the user device.

2. The method of claim 1, wherein the memory of the receiver device is a programmable read-only memory.

3. The method of claim 1, wherein the setting is based on input received at the user device via a settings user interface.

4. The method of claim 1, wherein the setting further identifies that message data from a first data source should be removed, the first data source being one of an advertisement data provider, an emergency data provider, or a sports data provider.

5. The method of claim 1, wherein the user device draws power from a first battery, and wherein the receiver device draws power from a second battery that is distinct from the first battery.

6. The method of claim 1, wherein the user device draws power from a first battery, and wherein the receiver device draws power from an external power source that is distinct from the first battery, the external power source including one of a power grid socket, an external battery, or a generator.

7. The method of claim 1, wherein the receiver device includes, in addition to the light sensor, at least one of a microphone or an electromagnetic coil.

8. The method of claim 1, wherein the message includes at least one of text, images, audio, video, document files, data structure files, or software executable files.

9. The method of claim 1, further comprising identifying that the wireless transmitter is an authorized source of the message.

10. The method of claim 1, further comprising identifying that the receiver device is an authorized recipient of the wireless transmission.

11. A system for wireless digital communication, the system comprising:
a receiver device that is communicatively coupled to a user device via a Bluetooth connection, wherein execution of instructions stored in a first memory of the receiver device by a processor of the receiver device:
receives a wireless transmission via a light sensor of the receiver device, wherein the wireless transmission was sent from a wireless transmitter via a light-based wireless transmission protocol thereby making the wireless transmission interpretable by the receiver device but not by the user device,
decodes a message code at the receiver device, the message code included within the wireless transmission,
retrieves a receiver code from a second memory of the receiver device,
identifies that the message code matches the receiver code,
identifies that the receiver device is authorized to read a message encoded within at least a subset of the wireless transmission based on the identified match between the message code and the receiver code,
decodes a message included within the wireless transmission based on the identification that the receiver device is authorized to read the message,
identifies that the message includes executable software as a first content type and at least one second content type selected from a text content type, an image content type, an audio content type, a video content type, a document content type, a data structure content type, or a data file content type,
receives a setting from the user device, the setting identifying that the first content type is disallowed in the message,
modifies the message by removing the first content type from the message without removing the second content type from the message, and
transmits at least the modified message from the receiver device to the user device using the wireless Bluetooth connection, thereby outputting at least a subset of the message at the user device.

12. The system of claim 11, wherein the second memory is the first memory.

13. The system of claim 11, wherein the second memory is distinct from the first memory.

14. The system of claim 11, wherein the second memory is a programmable read-only memory.

15. The system of claim 11, further comprising a second battery that provides electrical current to the receiver device, the second battery being distinct from a first battery that provides electrical current to the user device.

16. The system of claim 11, further comprising an external power source that provides electrical current to the receiver device, the external power source being distinct from a first battery that provides electrical current to the user device, the external power source being at one of a power grid socket, an external battery, or a generator.

17. The system of claim 11, wherein the receiver device includes, in addition to the light sensor, at least one of a microphone or an electromagnetic coil.

18. The system of claim 11, wherein wireless transmission was sent via the light-based wireless transmission protocol using at least one of visible light, infrared light, or ultraviolet light.

19. A non-transitory computer-readable storage medium, having embodied thereon a program executable by a processor to perform a method for wireless digital communication, the method comprising:

receiving a wireless transmission at a receiver device via a light sensor of the receiver device, the receiver device communicatively coupled to a user device via a wireless Bluetooth connection, the wireless transmission sent from a wireless transmitter via a light-based wireless transmission protocol thereby making the wireless transmission interpretable by the receiver device but not by the user device;

decoding a message code at the receiver device, the message code included within the wireless transmission;

retrieving a receiver code from a memory of the receiver device;

identifying that the message code matches the receiver code;

identifying that the receiver device is authorized to read a message encoded within at least a subset of the wireless transmission based on the identified match between the message code and the receiver code;

decoding a message included within the wireless transmission based on the identification that the receiver device is authorized to read the message;

identifying that the message includes executable software as a first content type and at least one second content type selected from a text content type, an image content type, an audio content type, a video content type, a document content type, a data structure content type, or a data file content type;

receiving a setting from the user device, the setting identifying that the first content type is disallowed in the message;

modifying the message by removing the first content type from the message without removing the second content type from the message; and transmitting at least the modified message from the receiver device to the user device using the wireless Bluetooth connection, thereby outputting at least a subset of the message at the user device.

20. The method of claim 1, wherein wireless transmission was sent via the light-based wireless transmission protocol using at least one of visible light, infrared light, or ultraviolet light.

* * * * *